United States Patent [19]

Ruell et al.

[11] 4,356,396

[45] Oct. 26, 1982

[54] FIBER OPTICAL MEASURING DEVICE WITH COMPENSATING PROPERTIES

[75] Inventors: Hartwig Ruell, Fuerstenfeldbruck; Ekkehard Klement, Munich, both of Fed. Rep. of Germany

[73] Assignee: Siemens Corporation, Iselin, N.J.

[21] Appl. No.: 217,452

[22] Filed: Dec. 17, 1980

[51] Int. Cl.³ .............................................. G02B 5/14
[52] U.S. Cl. .................................... 250/227; 250/226
[58] Field of Search ..................... 250/226, 227, 205; 350/96.1, 96.24

[56] References Cited

U.S. PATENT DOCUMENTS 3,986,777 10/1976 Roll ..................................... 250/226
4,275,296 6/1981 Adolfsson ........................... 250/227

FOREIGN PATENT DOCUMENTS 2016684 9/1980 United Kingdom .

OTHER PUBLICATIONS

"Fiber Optics: The Way to True Digital Sensors?" by James et al., Control Engineering, Feb. 1979, pp. 30-33.

Primary Examiner—David C. Nelms
Attorney, Agent, or Firm—Karl F. Milde; Russel G. Pelton

[57] ABSTRACT

The fiber optical measuring device contains a fiber optical transmission line into whose input end are directed a first and a second light beam. Both light beams have wavelengths differing from each other. Associated with the output end of the transmission line is a mirror. This mirror passes the transmitted second light beam therethrough and reflects the transmitted first light beam back into the transmission line. Associated with the output end is also a sensor for measuring a physical parameter. This sensor receives the second light beam and returns a portion thereof back into the output end. This portion depends on the parameter to be measured. Arranged at the input end of the transmission line is an optical device which separates the reflected portion of the first light beam from the returned portion of the second light beam. A first optical detector transforms the first light beam portion into a first electric signal, and a second optical detector transforms the second light beam portion into a second electric signal. A signal processor determines the ratio between the second and the first electric signals. This ratio indicates the value of the physical parameter to be measured.

13 Claims, 3 Drawing Figures

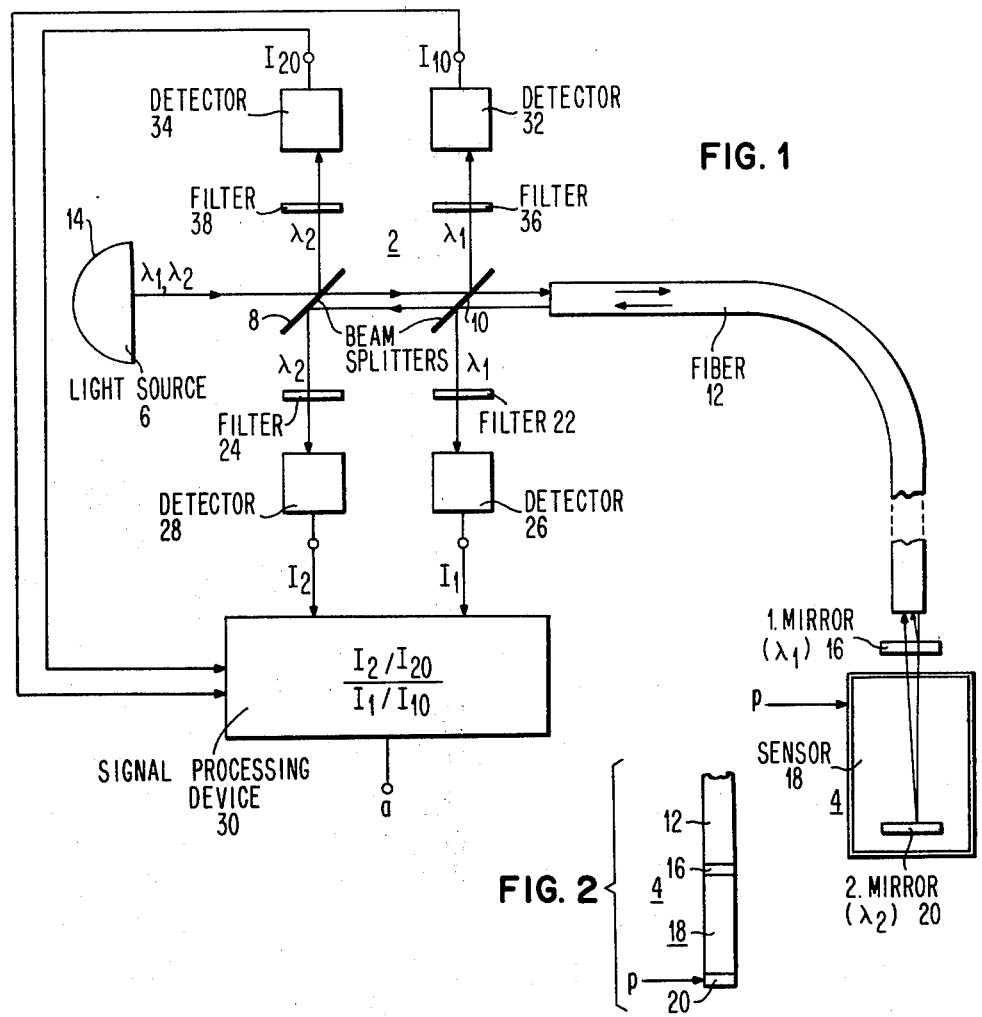
FIG. 1
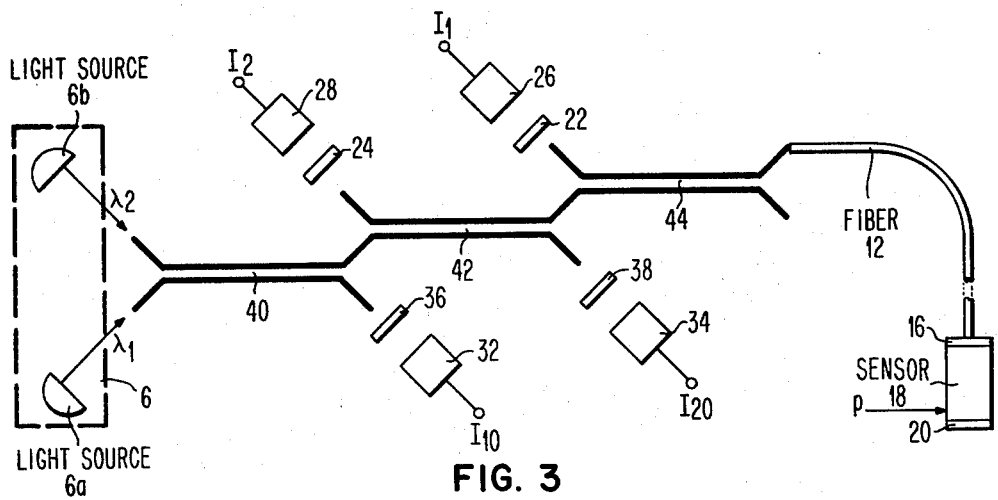
FIG. 2
FIG. 3

4,356,396

FIBER OPTICAL MEASURING DEVICE WITH COMPENSATING PROPERTIES

BACKGROUND OF THE INVENTION

1. Field of the Invention

This invention relates to a measuring device for sensing a physical parameter such as pressure, temperature, etc. In particular, this invention relates to a fiber optical measuring device in which a change of a physical parameter is transformed into a change of light intensity, which intensity change is evaluated at a location remote from the location where the physical parameter change is sensed. Still more particularly, this invention relates to a fiber optical measuring device which contains a sensor for sensing a physical parameter and a fiber optical transmission line for optically transmitting the sensed parameter to the location of evaluation, whereby means are provided for compensating for changes in the transmission properties of the transmission line.

2. Description of the Prior Art

In the prior art, various measuring devices are known for measuring a physical parameter by measuring the intensity of a light beam. Such measuring devices are used for measuring parameters such as pressure, temperature and flow rate. These fiber optical measuring devices usually include a fiber optical transmission line or cable, a light source illuminating the first end of the transmission line, a sensor or transducer arranged on the second end of the transmission line for measuring the physical parameter by means of the transmitted light and for returning a corresponding light intensity into the second end of the line, a branching element or coupler (such as a semi-permeable mirror) on the first end side, a photodetector for measuring the returned light and a signal processing device connected to the photodetector for issuing an output signal in accordance with the parameter ("Control Engineering", Feb. 1979, pages 30-33, especially page 33, left column).

The sensor on the measurement side of such a measuring device may contain a reflector which is movable in dependence on the physical parameter either perpendicularly or parallel to the end face of the fiber optical transmission line (German Offenlegungsschrift No. 20 34 344, FIGS. 2, 5a and 5b; German Offenlegungsschrift No. 28 49 186, FIG. 8; European Patent Application Publication Number 10 221, FIG. 1).

In such measuring devices, the fiber optical transmission line is exposed to the influence of the environment, for instance, to temperature changes, mechanical stress, irradiation, vibrations, etc. These effects or influences caused by these effects may create light losses in the fiber optical transmission line. These and other effects, for instance bending of the fiber(s), may introduce errors in the measurements and therefore may result in erroneous readings. For this reason, means are required that compensate for such influences and errors.

In the fiber optical measuring device according to the British Patent Application No. 2,016,684, particularly FIG. 1, two alternatingly energized light sources emitting different wavelengths are provided. In this fiber optical measuring device, different fibers are used for light transmission in the forward and in the backward direction. This results in strict requirements with regard to the adjustment of the various components. In addition, only a small light intensity may be available on the evaluation side. Further, the prior art designed is based on two light sources which are switched on and off alternatingly. This may require a sophisticated evaluation circuitry.

SUMMARY OF THE INVENTION

1. Objects

It is an object of this invention to provide a fiber optical measuring device which is of simple structure and wherein measurement effects due to changes of the optical properties of the transmission line are eliminated to a large extent.

It is another object of this invention to provide a fiber optical measuring device for measuring one of various parameters, such as pressure and temperature, and to compensate for measuring errors which might be introduced by effects creating losses in the fiber(s), such as bending losses.

It is still another object of this invention to provide a fiber optical measuring device which can easily be adjusted and which does not require any sophisticated opto-mechanical components.

It is still another object of this invention to provide a fiber optical measuring device which provides comparatively high intensities of the optical signals transmitted from the sensing side to the evaluation side of a fiber optical transmission line.

It is still another object of this invention to provide a fiber optical measuring device in which a single fiber transmission line or even a single individual fiber of such a line is used for light and/or signal transmission in either direction.

It is still another object of this invention to provide a fiber optical measuring device which does not require any auxiliary energy sources on the measuring side for compensation of influences of the surroundings.

2. Summary

According to this invention, a fiber optical measuring device contains a fiber optical transmission line which has an input end and an output end for transmitting light therebetween. The device also contains a first light source for generating a first light beam having a first wavelength, and a second light source for generating a second light beam having a second light wavelength. The first wavelength is different from the second wavelength. Both light sources may be part of a light generating unit which may also include lenses, mirrors, etc. Both light sources are operated simultaneously. The device further contains an optical element for directing the first and the second light beam into the first end of the transmission line. As a result, the first and second light beams will be transmitted from the first or input end to the second or output end of the transmission line. The device also contains a first mirror which is arranged on the second or output end side of the transmission line. This first mirror fulfills two purposes. It passes a large portion of the transmitted second light beam therethrough, and it reflects a large portion of the transmitted first light beam back into the output end of the transmission line. This reflected first light beam is transmitted from the output end to the input end of the transmission line.

The device also contains a sensor or transducer which is arranged on the output end side of the fiber optical transmission line. This sensor is determined for measuring a physical parameter or magnitude such as temperature, pressure, flow rate, etc. by optical means. Any conventional sensor of this kind may be applied. The sensor receives the transmitted second light beam which has passed through the first mirror, and returns a portion of this light beam back into the output end. The magnitude of the returned light portion depends on and varies in accordance with the physical parameter to be measured. The returned second light beam is also transmitted from the output end to the input end of the transmission line.

The device also contains an optical light separating system which is located on the first end side of the transmission line. This optical system is used for separating the reflected first light beam from the returned second light beam. This optical system may comprise beam splitters arranged one behind the other in light beam direction.

The device further contains first and second optical detectors which are also arranged on the input end side or evaluation side of the transmission line. The first optical detector receives the reflected first light beam from the optical light separating system and transforms it into a first electric signal, and the second optical detector correspondingly transforms the returned second light beam into a second electric signal.

The device also contains signal processing circuitry which basically detects or determines the ratio between the second and the first electric signal. This ratio indicates the value of the physical parameter to be measured.

It is of specific advantage for the evaluation of an output signal if a third signal corresponding to the intensity of the first light beam and a fourth signal corresponding to the intensity of the second light beam are derived and incorporated in the evaluation process. In such embodiment, the output signal of the signal processing device will be independent from the intensity of the first and the second light source.

The fiber optical measuring device may preferably be used in industrial applications, such as chemical or power plants. Another preferred use is the application in an automobile, where various functions have to be monitored.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:

FIG. 1 is a fiber optical measuring device with compensating properties according to the invention;

FIG. 2 is a schematic representation of a conventional sensor which can be used in connection with the device of FIG. 1; and FIG. 3 is a fiber optical measuring device with compensating properties according to the invention, utilizing waveguide technology.

DETAILED DESCRIPTION OF THE PREFERRED EMBODIMENTS

With reference to FIG. 1, the fiber optical measuring device has an evaluation side 2 and a measuring side 4. A light source 6 is located at the evaluation side 2. The light source 6 generates a first light beam which has the first wavelength $\lambda_1$. The light source 6 also generates a second light beam which has a second wavelength $\lambda_2$. The wavelengths $\lambda_1$ and $\lambda_2$ are different from each other. Both light beams are transmitted through a couple of beam splitters 8 and 10 into the first or input end of a fiber optical transmission line or cable 12.

The light source 6 is suitably selected. It may contain some focussing means, as indicated by the round shape of the backside 14. The light source 6 may, for instance, comprise two light emitting diodes (LED) or lasers (not shown in FIG. 1) the light beams of which may be combined by a mirror system (not shown). Both light emitters may be operated and energized simultaneously.

As mentioned above, the first and the second light beam are directed into the first or input end of the transmission line 12. There may be provided additional directing means (not shown) for instance, lenses, mirrors, or simply a tube protecting and housing the source 6 generating the first and the second light beam. Both light beams are transmitted from the input end to the output end of the fiber optical transmission line 12.

On the second end side or measuring side 4 of the fiber optical transmission line 12 is located a first mirror 16. The first mirror 16 may be a thin reflecting layer formed on the end face of the fiber 12. The first mirror 16 may also be a separate unit, as shown in FIG. 1. It reflects primarily or only light of the first wavelength $\lambda_1$. Therefore, at least a large portion of the transmitted first light beam is reflected back into the output end of the transmission line 12. From here this portion is transmitted to the input end or evaluation side 2. The first mirror 16 is also selected such that at least a large portion of the transmitted second light beam may pass therethrough. This portion is received by a sensor 18.

The sensor 18 is arranged on the measuring side 4 for measuring a physical parameter p. It is designed to change in any well known manner the intensity of the entering light beam in accordance with or in dependence on the physical parameter p. The construction of the sensor 18 is such that it returns a portion of the arriving light beam back into the output end of the fiber 12. The returned second light beam is thereby transmitted from the output end to the input end of the transmission line 12.

In the embodiment illustrated in FIG. 1, a well-known sensor 18 is applied which contains a second mirror 20 at its end. A change of the parameter p may cause a change in the position of the mirror 20. The mirror 20 may be, for instance, a vibrating mirror. The second mirror 20 is selected such that it reflects primarily or only light of the second wavelength $\lambda_2$. The intensity of the reflected light is modulated according to the changes of the physical parameter p. This parameter p may be, for instance, pressure or temperature. It also may be another quantity measured in an automobile.

In another embodiment (not shown), the second light beam may pass through the sensor 18. It may then be returned, for instance, by fiber optical means and/or a mirror system, to the output end of the fiber optical transmission line 12.

It will be noted that in the embodiment of FIG. 1 the light beams reflected by the mirrors 16 and 20 are both directed into the second end of the same fiber optical transmission line 12. Both reflected light components are transmitted through the transmission line 12 toward the evaluation side 2.

On the evaluation side 2, the returning light is divided by an optical light separating system comprising the two beam splitters 8 and 10 into partial beams having the wavelengths $\lambda_2$ and $\lambda_1$, respectively. In other words, the beam splitters 8 and 10 separate the light reflected by the first mirror 16 from the light reflected by the second mirror 20. Any other conventional light separating system may be applied. Both beams may then pass through narrow band filters 22 and 24, respectively. These band filters 22 and 24 only let pass light of the wavelength $\lambda_1$ and $\lambda_2$, respectively. Subsequently the first light component impinges upon a first optical detector or photodetector 26 which delivers a first electric output signal $I_1$ proportional to the incident light intensity. The second light component impinges upon a second optical detector or photodetector 28 which transforms the second light component into a second electric output signal $I_2$. This second electric output signal $I_2$ is proportional to the light intensity of the second light component.

The first and the second electric signals $I_1$ and $I_2$ are forwarded to a signal processing device 30 which basically forms the $I_2/I_1$ ratio of these signals. This processing device 30 may also include means for forming the logarithmic $I_2/I_1$ ratio. The device 30 may also include an amplifier (not shown). At the output, an output signal a is derived. This signal is proportional to the ratio $I_2/I_1$ or log $(I_2/I_1)$, respectively.

The light component reflected by the first mirror 16 carries all the noise or perturbations introduced by the fiber optical transmission line 12. These perturbations may be caused by bending of the fiber optical line 12 or by other intensity reducing effects. The light component reflected by the second mirror 20 contains information about the physical parameter p to be measured and additionally about the noise or perturbation caused by intensity reducing effects in the transmission line 12. By dividing the second signal $I_2$ by the first signal $I_1$ the impact of the perturbation effects is compensated or widely eliminated.

As illustrated in FIG. 1, it is of advantage to derive two additional signals $I_{10}$ and $I_{20}$ and to introduce these additional signals into the signal processing device 30. According to FIG. 1, the first light beam of the light source 6 passes through the beam splitter 8 and is partially reflected by the beam splitter 10. The reflected light portion is directed to a third optical detector 32. According to FIG. 1, the second light beam is partially reflected by the beam splitter 8. The reflected light portion is directed to a fourth optical detector 34.

The third detector 32 is part of a device for supplying a third electric signal $I_{10}$ which corresponds to the intensity of the first light beam having the wavelength $\lambda_1$. The fourth detector 34 is part of a device for supplying a fourth electric signal $I_{20}$ which corresponds to the intensity of the second light beam having the wavelength $\lambda_2$. The third optical detector 32 thus transforms a portion of the first light beam into the third electric signal $I_{10}$. The fourth optical detector 34 correspondingly transforms a portion of the second light beam into the fourth electric signal $I_{20}$. In the light paths leadint to the detectors 32 and 34, there may be arranged narrow band filters 36 and 38, respectively.

The third and fourth electric signal $I_{10}$ and $I_{20}$ are forwarded to the signal processing device 30. The signal processing device 30 forms the output signal a in accordance with the ratio of a second and first relative intensity. The first relative intensity ($I_1/I_{10}$) is formed by the ratio of the first and the third electric signal $I_1$ and $I_{10}$, respectively, and the second relative intensity ($I_2/I_{20}$) is formed by the ratio of the second and the fourth electric signal $I_2$ and $I_{20}$, respectively. The first relative intensity ($I_1/I_{10}$) is independent from the output of the light source 6 emitting the first light beam having the first wavelength $\lambda_1$, and the second relative intensity ($I_2/I_{20}$) is independent of the output of the light source 6 emitting the second light beam having the second wavelength $\lambda_2$. Thus, the output signal a is proportional to the ratio $(I_2/I_{20})/(I_1/I_{10})$. In this output signal a intensity variations of the light sources are eliminated.

It should be mentioned that in another embodiment (not shown) the devices for supplying the third and fourth electric signal $I_{10}$ and $I_{20}$ may simply be electrical tapping at the electrical supply lines of the individual light sources, if a light source 6 containing two individual light sources is used. These tappings may either represent the current or the voltage of the individual light source.

There are fiber optical measurement concepts which require polarizing elements such as single crystals, polarizing foils, etc. It is sometimes difficult to integrate such elements in a simple manner into a fiber optical sensor. Where such a polarizing element or polarizer is required, well-known polarizing fibers can be used as fiber optical transmission line 12. Thus, requirements relating to space or volume can be met.

In FIG. 2 is illustrated that a sensor 18 of any of the various conventional concepts may be used on the measuring side 4. The sensor 18 in FIG. 2 contains a first mirror 16 which is arranged between the sensor 18 and the transmission line 12 and directly adjacent to both of these elements. In this embodiment, the physical parameter p acts directly on the second mirror 20.

In FIG. 3 is illustrated a fiber optical measurement device utilizing waveguide technology. The advantages of such a system are: it is small, inexpensive, rugged, stable, and it operates without optical lenses. In FIG. 3 the same numerals refer to the same elements and components as in FIG. 1.

As illustrated in FIG. 3, three waveguide couplers 40, 42 and 44 of known design are applied. The light source 6 comprises here two individual light sources 6a and 6b for emitting light of the first wavelength $\lambda_1$ and for emitting light of the second wavelength $\lambda_2$, respectively. The light of these light sources 6a and 6b is introduced into the two left ends of the light coupler 40, respectively. The two right ends of the light coupler 40 are directed to the third detector 32 and to the first left end of the second waveguide coupler 42, respectively. To the second left end of the second waveguide coupler 42 is optically associated the second detector 28. To the first right end is associated the fourth detector 34, and to the second right end is associated the first left end of the third waveguide coupler 44. The second left end of this waveguide coupler 44 is connected optically to the first detector 26. The first right end may be an open end. The second right end is optically connected to the first end of the fiber optical transmission line 12.

The operation of the fiber optical measuring device illustrated in FIG. 3 is the same as that of FIG. 1. The two light beams having the wavelengths $\lambda_1$ and $\lambda_2$ are coupled through the three waveguide couplers 40, 42 and 44 to the first or input end of the optical transmission line 12. Light which returns from the transmission line 12 is coupled through the second or output left ends of the waveguide couplers 44 and 42 into the first and second detector 26 and 28, respectively. The light from the two individual light sources 6a and 6b is received by the third and fourth detector 32 and 34 through the first right ends of the couplers 40 and 42. Beam splitters 8 and 10 as illustrated in FIG. 1 are not required in the embodiment of FIG. 3.

While the forms of the measuring device herein described constitute preferred embodiments of the invention, it is to be understood that the invention is not limited thereto, and that a variety of changes may be made therein without departing from the scope of the invention.

What is claimed is:

1. A fiber optical measuring device, comprising in combination:
   (a) a fiber optical transmission line having an input end and an output end for transmitting light therebetween;
   (b) means for generating a first light beam having a first wavelength;
   (c) means for generating a second light beam having a second wavelength differing from said first wavelength;
   (d) means for directing said first and second light beam into said input end of said transmission line, said first and said second light beam thereby being transmitted from said input end to said output end of said transmission line;
   (e) a first mirror associated with said output end for passing at least a portion of said transmitted second light beam therethrough and for reflecting at least a portion of said transmitted first light beam back into said transmission line, the reflected first light beam thereby being transmitted from said output end to said input end thereof;
   (f) a sensor associated with said output end for measuring a physical parameter, for receiving said second light beam and returning a portion of said second beam dependent upon the physical parameter back into said output end of said transmission line;
   (g) an optical device arranged with said input end for separating the reflected portion of said first light beam from the returned portion of said second light beam;
   (h) a first optical detector exposed to light from said optical device for transforming said reflected first light beam portion into a first electric signal;
   (i) a second optical detector exposed to light from said optical device for transforming said returned second light beam portion into a second electric signal; and
   (j) a signal processor for determining the ratio between said second and first electric signals, said ratio indicating the value of the physical parameter to be measured.

2. The fiber optical measuring device according to claim 1, wherein said sensor comprises a second mirror for reflecting said portion of said second light beam back into said output end of said line.

3. The fiber optical measuring device according to claim 2, wherein the physical position of said second mirror with respect to said output end is dependent upon the physical parameter to be measured.

4. The fiber optical measuring device according to claim 1, wherein said sensor is a temperature sensor.

5. The fiber optical measuring device according to claim 1, wherein said sensor is a pressure sensor.

6. The fiber optical measuring device according to claim 1, further comprising:
   (a) means for supplying a third electric signal, said third electric signal corresponding to the intensity of said first light beam; and
   (b) means for supplying a fourth electric signal, said fourth electric signal corresponding to the intensity of said second light beam, and
wherein said signal device comprises means for forming an output signal in accordance with the ratio of second and first relative intensities, wherein said first relative intensity is formed by the ratio of said first and said third electric signal, and wherein said second relative intensity is formed by the ratio of said second and said fourth electric signal.

7. The fiber optical measuring device according to claim 6, wherein said means for supplying said third electric signal contains a third optical detector which transforms a portion of said first light beam into said third electric signal, and wherein said means for supplying said fourth electric signal contains a fourth optical detector which transforms a portion of said second light beam into said fourth electric signal.

8. The fiber optical measuring device according to claim 1, wherein said means for generating said first and second light beam comprises two separate light sources.

9. The fiber optical measuring device according to claim 1, wherein said optical device for separating said reflected and returned light beams comprises a first and a second beam splitter arranged in beam line for splitting off light having said first wavelength and said second wavelength, respectively.

10. The fiber optical measuring device according to claim 1, wherein said fiber optical transmission line comprises a polarizing optical fiber.

11. The fiber optical measuring device according to claim 1, wherein said directing means comprises focussing means for coupling said first and second light beam into said input end.

12. The fiber optical measuring device according to claim 1, wherein said directing means comprises at least one waveguide coupler for coupling said first and said second light beam into said input end.

13. The fiber optical measuring device according to claim 1, wherein at least two waveguide couplers are provided for coupling said reflected and returned light beams out of said input end of said transmission line.

* * * * *